United States Patent
Maede et al.

(10) Patent No.: US 9,634,564 B2
(45) Date of Patent: Apr. 25, 2017

(54) CONTROL CIRCUIT AND CONTROL METHOD OF DIGITAL CONTROL POWER SUPPLY CIRCUIT, AND DIGITAL CONTROL POWER SUPPLY CIRCUIT, ELECTRONIC DEVICE AND BASE STATION USING THE SAME

(71) Applicant: ROHM CO., LTD., Ukyo-ku, Kyoto (JP)

(72) Inventors: Jun Maede, Kyoto (JP); Yuichi Shinozaki, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 119 days.

(21) Appl. No.: 14/635,306

(22) Filed: Mar. 2, 2015

(65) Prior Publication Data
US 2015/0249386 A1  Sep. 3, 2015

(30) Foreign Application Priority Data

Mar. 3, 2014  (JP) ................... 2014-040978

(51) Int. Cl.
*H02M 3/157* (2006.01)
(52) U.S. Cl.
CPC .................. *H02M 3/157* (2013.01)
(58) Field of Classification Search
CPC ................................................ H02M 3/157
See application file for complete search history.

(56) References Cited

U.S. PATENT DOCUMENTS

| 2006/0250120 A1* | 11/2006 | King ............... H02M 3/157 323/283 |
| 2013/0082675 A1* | 4/2013 | Capodivacca ......... G05F 1/468 323/283 |
| 2015/0138844 A1* | 5/2015 | Karlsson ........... H02M 3/33592 363/21.1 |

FOREIGN PATENT DOCUMENTS

JP  2003284322 A  10/2003

* cited by examiner

*Primary Examiner* — Harry Behm
(74) *Attorney, Agent, or Firm* — Cantor Colburn LLP

(57) ABSTRACT

A control circuit of a digital control power supply circuit includes: an A/D converter that samples a feedback voltage according to an output voltage of the power supply circuit when a strobe signal is asserted, and converts the sampled feedback voltage into digital feedback data; an error detector that generates error data which indicates a difference between the feedback data and target data; a compensator that generates a duty command value which is adjusted to approximate the error data to zero; a digital pulse width modulator that receives the duty command value and generates a pulse signal having a duty ratio corresponding to the duty command value; and a strobe signal generator that generates the strobe signal and adjusts a sampling timing at which the strobe signal is asserted such that the sampling timing approximates a target position set in a substantial center of a slope of the output voltage.

14 Claims, 8 Drawing Sheets

CONTROL CIRCUIT AND CONTROL METHOD OF DIGITAL CONTROL POWER SUPPLY CIRCUIT, AND DIGITAL CONTROL POWER SUPPLY CIRCUIT, ELECTRONIC DEVICE AND BASE STATION USING THE SAME

CROSS-REFERENCE TO RELATED APPLICATION

This application is based upon and claims the benefit of priority from Japanese Patent Application No. 2014-040978, filed on Mar. 3, 2014, the entire contents of which are incorporated herein by reference.

TECHNICAL FIELD

The present disclosure relates to relates to a digital control power supply circuit.

BACKGROUND

In order to generate a voltage higher or lower than a given input voltage, a power supply circuit such as a DC/DC converter (switching regulator) or the like is used. Such a power supply circuit includes an analog control type power supply circuit and a digital control type power supply circuit. In the analog control type power supply circuit, an error between an output voltage of the power supply circuit and a target value thereof is amplified by an error amplifier and a switching duty ratio is controlled based on an output from the error amplifier, thus stabilizing the output voltage with a target value. In the digital control type power supply circuit, an output voltage of the power supply circuit is converted into a digital value by an A/D converter, and a duty ratio of a switching transistor is controlled by digital signal processing.

The digital control type power supply circuit (which is also referred to as a digital control power supply circuit, hereinafter, simply as a power supply circuit) is less restricted in a control algorithm, having a high degree of freedom in design and also having an advantage in that a control scheme may be altered by software. Further, in a long-term operation, the history of various data may be maintained as digital values.

FIG. 1 is a block diagram illustrating a configuration of a digital control power supply circuit (simply referred to as a power supply circuit) reviewed by the inventors of the present disclosure.

A power supply circuit 2r includes a control circuit 10r and an output circuit 20r. The power supply circuit 2r receives an input voltage $V_{IN}$ from an input line 200, steps the input voltage $V_{IN}$ down, and supplies an output voltage $V_{OUT}$ to a load (not shown) connected to an output line 202.

The output circuit 20r includes a driver 204, a switching transistor M1, a synchronous rectification transistor M2, an inductor L1, and an output capacitor C1. In FIG. 1, an output circuit of a step-down (buck) DC/DC converter is illustrated. The driver 204 switches the switching transistor M1 and the synchronous rectification transistor M2 depending on a pulse signal S1 output from an output terminal OUT of the control circuit 10r.

A feedback voltage $V_{FB}$ that corresponds to the output voltage \T$_{our}$ is input to a feedback terminal FB of the control circuit 10r. The control circuit 10r includes an A/D converter 100, an error detector 102, a compensator 104, and a digital pulse width modulator (DPWM) 106. The A/D converter 100 converts the feedback voltage $V_{FB}$ into digital feedback data S2. The error detector 102 calculates error data S3 indicating a difference between the feedback data S2 and a target value $D_{REF}$ The compensator 104 performs PID control or the like to generate a duty command value S5 which is adjusted to make the error data S3 close to zero. The DPWM 106 receives the duty command value S5 and generates a pulse signal S1 having a corresponding duty ratio.

The present inventors have reviewed a power supply rejection ratio (PSRR) of the power supply circuit 2r of FIG. 1 and recognized the following tasks. Here, a supply voltage corresponds to the input voltage $V_{IN}$ of the power supply circuit 2r.

Here, a component resulting from a voltage drop of an equivalent series resistance (ESR) of the output capacitor C1 is noted as a ripple of the output voltage $V_{OUT}$ The ripple $V_{RIP}$ at this time is expressed by Eq. (1) shown below:

$$V_{RIP}=ESR \times V_{OUT} \times (1-D)/(L \cdot f_{SW}), \qquad \text{Eq. (1)}$$

wherein D is a switching duty ratio, $f_{SW}$ is a switching frequency, and L is an inductance of the inductor L1.

In the step-down DC/DC converter, the duty ratio D in a normal state is given as a ratio of the output voltage $V_{OUT}$ to the input voltage $V_{IN}$:

$$D=V_{OUT}/V_{IN}. \qquad \text{Eq. (2)}$$

Thus, when the input voltage $V_{IN}$ is changed by ±1%, the duty ratio D is also changed by ±1% and the ripple $V_{RIP}$ is also changed by 1%.

FIG. 2 is an operational waveform diagram of the power supply circuit 2r of FIG. 1. A case in which the A/D converter 100 samples the output voltage $V_{OUT}$ one time at every switching period is considered. Here, it is assumed that the output voltage $V_{OUT}$ is sampled at a timing when the switching transistor M1 is turned off. In this case, the output voltage $V_{OUT}$ is sampled at a peak of the ripple, and is fed-back while the duty ratio D is adjusted such that the peak value of the output voltage $V_{OUT}$ approximates a target value $V_{REF}$. Supplied to the load is an average level $V_{OUT\_AVE}$ of the output voltage VOUT, which is given by Eq. (3):

$$V_{OUT\_AVE}=V_{REF}-V_{RIP}/2. \qquad \text{Eq. (3)}$$

That is, the average level $V_{OUT\_AVE}$ of the output voltage $V_{OUT}$ decreases with the increase of the ripple $V_{RIP}$. In FIG. 2, $I_L$ denotes a coil current flowing in the inductor L1.

When a PSRR given by Eq. (4) is calculated under a condition that $V_{OUT}$=12 V and $V_{RIP}$=25 mVpp, the PSRR becomes 60 dB, which may fall within a level that cannot be allowed depending on purposes:

$$PSRR=20 \log(V_{RIP}/(2 \cdot V_{OUT}))[dB]. \qquad \text{Eq. (4)}$$

SUMMARY

The present disclosure provides some embodiments of a digital control power supply circuit capable of improving a PSRR, and a control circuit thereof.

According to an embodiment of the present disclosure, there is provided a control circuit of a digital control power supply circuit. The control circuit includes an A/D converter that samples a feedback voltage according to an output voltage of the digital control power supply circuit when a strobe signal is asserted and that converts the sampled feedback voltage into digital feedback data; an error detector that generates error data which indicates a difference between the feedback data received from the A/D converter and target data indicating a target value of the feedback voltage; a compensator that generates a duty command value which is adjusted to approximate the error data received from the error detector to zero; a digital pulse width modulator that receives the duty command value from the compensator and that generates a pulse signal having a duty ratio corresponding to the received duty command value; and a strobe signal generator that generates the strobe signal, and that adjusts a sampling timing at which the strobe signal is asserted such that the sampling timing approximates a target position set in the middle of a slope of the output voltage.

According to this embodiment, the A/D converter may set a sampling timing in an arbitrary position in a slope of a ripple of the output voltage. Thus, even though an input voltage fluctuates and thus a ripple amount of the output voltage is changed, the center of the ripple of the output voltage is stabilized to a reference voltage depending on the target value. Accordingly, the PSRR of the power supply circuit can be improved.

The strobe signal generator may include a period counter that asserts the strobe signal at every period which depends on a variable period set value; and a period setting unit that sets the target position, that obtains an error time between the sampling timing and the target position, and that sets the period set value based on the error time.

The period setting unit may set the period set value Ts(k) at a k-th cycle (where k=1, 2, . . . ) by Ts(k)=Tp+Kp×Δt(k), where Tp is a period of the pulse signal, Δt(k) is the error time at a k-th cycle, and Kp is a predetermined coefficient.

When a count value of the period counter reaches the period set value, the period counter may assert the strobe signal and resets the count value to an initial value to resume a counting operation.

The period setting unit may set the target position based on the duty command value. Alternatively, the period setting unit may set the target position based on an edge of the pulse signal.

The period setting unit may obtain the sampling timing based on the strobe signal. Alternatively, the period setting unit may obtain the sampling timing based on the period set value set by the period setting unit.

The digital pulse width modulator may generate a carrier having a periodically shifted value, and may shift the pulse signal at a crossing between a value of the carrier and the duty command value.

The compensator may perform a proportional-integral-derivative (PID) control.

The control circuit may be integrally integrated on a single semiconductor substrate.

"Integrally Integrated" may include a case in which all components of the circuit are formed on a semiconductor substrate, and may also include a case in which major components of the circuit are integrally integrated and some resistors, capacitors, or the like for circuit constant adjustment are installed outside of the semiconductor substrate.

According to another embodiment of the present disclosure, there is provided a digital control power supply circuit. The digital control power circuit may include an output circuit including at least switching transistors, an inductive element, and an output line that generates a DC output voltage based on a switching operation of the switching transistors; and the aforementioned control circuit that controls the switching transistors based on the output voltage. The inductive element may include an inductor or a transformer.

According to still another embodiment of the present disclosure, there is provided an electronic device. The electronic device includes the aforementioned digital control power supply circuit.

According to still another embodiment of the present disclosure, there is provided a base station for mobile communication. The base station includes the aforementioned digital control power supply circuit.

Further, arbitrary combinations of the foregoing components and substitution of the components and expressions of the present disclosure among a method, an apparatus, a system, and the like may also be effective as an aspect of the present disclosure.

DETAILED DESCRIPTION

Figure 1:
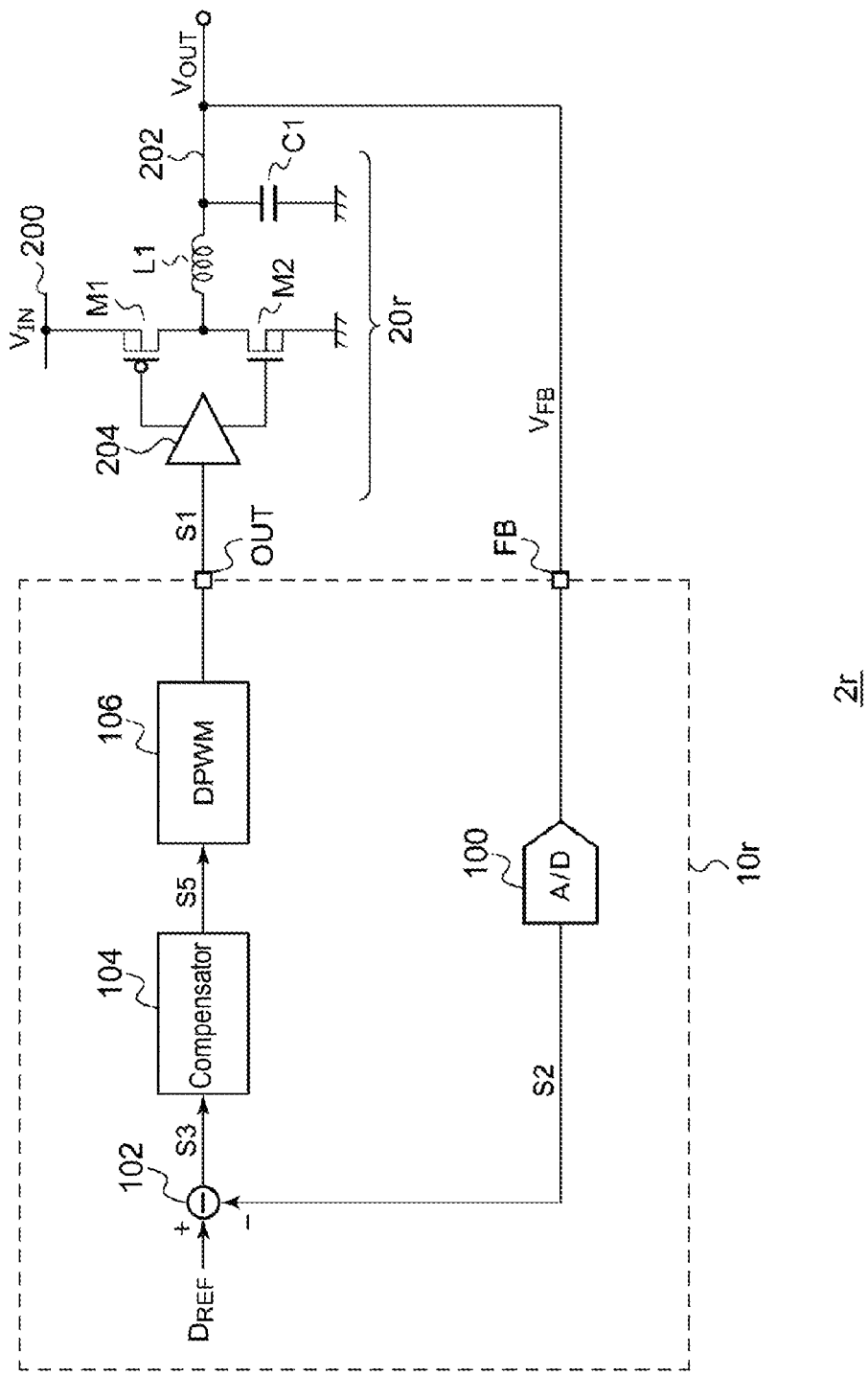
FIG. 1 is a block diagram of a digital control power supply circuit reviewed by the present inventors.
Figure 2:
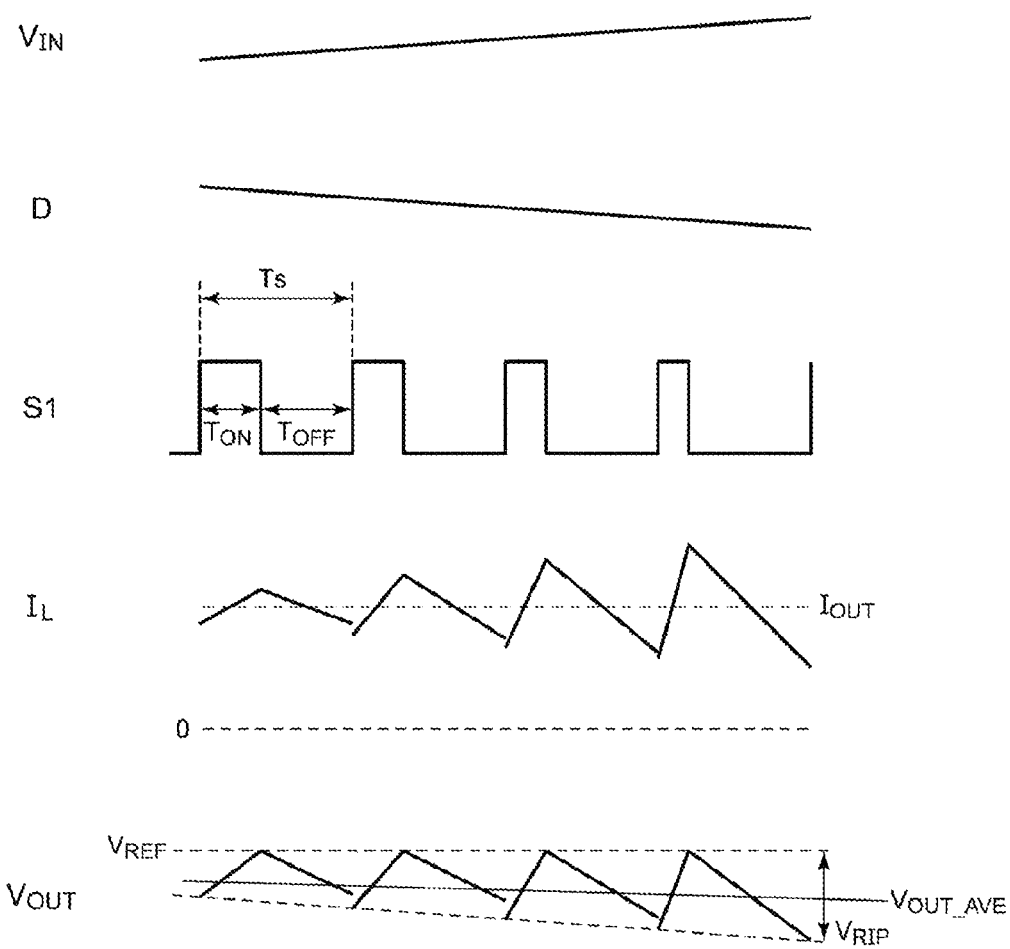
FIG. 2 is an operational waveform diagram of the power supply circuit of FIG. 1.

Hereinafter, the present disclosure will be described based on embodiments with reference to the drawings. Like or equivalent components, members, and processes illustrated in each drawing are given like reference numerals and a repeated description thereof will be properly omitted. Also, the embodiments are merely illustrative, without limiting the present disclosure, and any feature or combination thereof described in the embodiments may not necessarily be essential to the present disclosure.

In the present disclosure, "a state in which a member A is connected to a member B" includes a case in which the member A and the member B are physically directly connected or even a case in which the member A and the member B are indirectly connected through any other member that does not affect an electrical connection state therebetween. Further, "a state in which a member C is installed between a member A and a member B" also includes a case in which the member A and the member C or the member B and the member C are indirectly connected through any other member that does not affect the electrical connection state, in addition to a case in which the member A and the member C or the member B and the member C are directly connected.

Figure 3:
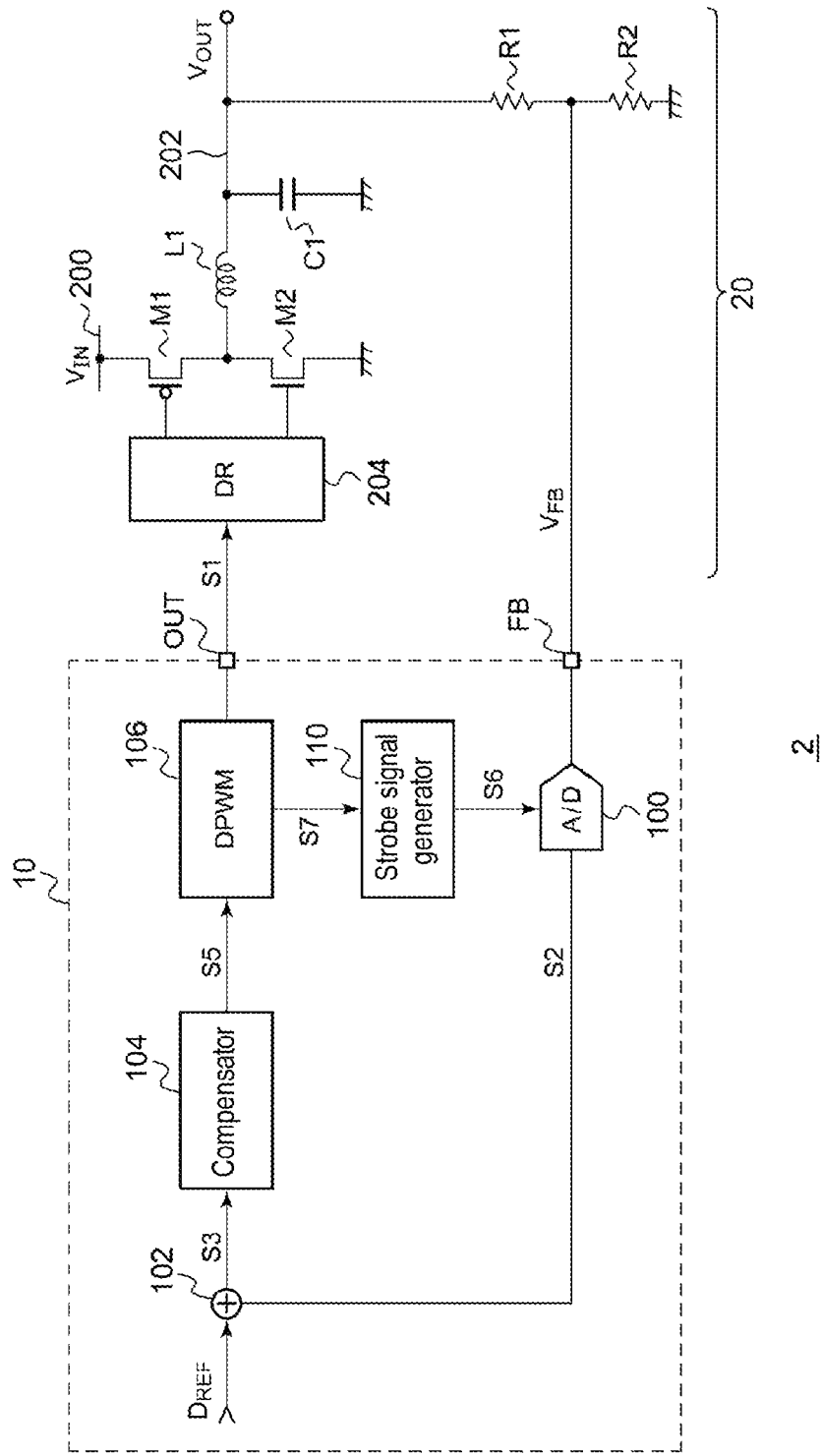
FIG. 3 is a circuit diagram of a power supply circuit according to an embodiment of the present disclosure.

FIG. 3 is a circuit diagram of a power supply circuit 2 according to an embodiment of the present disclosure. The power supply circuit 2 includes a control circuit 10 and an output circuit 20.

The output circuit 20 includes some circuit elements and wiring, which exist outside of the control circuit 10. The output circuit 20 has at least a switching transistor M1, an inductor L1, and an output line 202. FIG. 3 illustrates an output circuit of a step-down DC/DC converter, and further includes a synchronous rectification transistor M2, an output capacitor C1, and a driver 204. The driver 204 complementarily switches the switching transistor M1 and the synchronous rectification transistor M2 depending on a pulse signal S1 from an output terminal OUT of the control circuit 10 to step down an input voltage $V_{IN}$ of the input line 200 to thereby generate a DC output voltage $V_{OUT}$ stabilized with a predetermined level in the output line 202. When the pulse signal S1 has a high level, the driver 204 turns on the switching transistor M1 and turns off the synchronous rectification transistor M2, and when the pulse signal S1 has a low level, the driver 204 turns off the switching transistor M1 and turns on the synchronous rectification transistor M2.

Further, the topology of the output circuit 20 is not particularly limited and the output circuit 20 may be a step-up (or boost) converter, a buck-boost converter, or a voltage inversion converter. The output circuit 20 may be a converter using a transformer, instead of an inductor.

The control circuit 10 includes an A/D converter 100, an error detector 102, a compensator 104, a digital pulse width modulator (DPWM) 106, and a strobe signal generator 110 and is a functional integrated circuit (IC) integrated on a single semiconductor substrate. The control circuit 10 may be a part of a general microcomputer or may be an application specific IC (ASIC) designed for an exclusive use. Further, each block illustrated in FIG. 3 and other drawings may be configured as a dedicated hardware or may be configured by a processor that executes a software program.

A feedback voltage $V_{FB}$ that corresponds to the output voltage $V_{OUT}$ of the digital control power supply circuit 2 is input to the A/D converter 100 through an FB terminal. When a strobe signal S6 generated by the strobe signal generator 110 at every switching period is asserted, the A/D converter 100 samples the feedback voltage $V_{FB}$ to convert the same into digital feedback data S2. For example, the feedback voltage $V_{FB}$ is obtained by voltage-dividing the output voltage $V_{OUT}$ using a voltage-dividing resistance circuit configured by resistances R1 and R2 of the output circuit 20.

The error detector 102 generates error data S3 which indicates a difference between the feedback data S2 and target data $D_{REF}$ indicating a target value of the feedback voltage $V_{FB}$. The compensator 104 generates a duty command value S5 which is adjusted to approximate the error data S3 to zero. Operation processed by the compensator 104 is not particularly limited, but, for example, the compensator 104 may perform PID control. Alternatively, PI control or the like may be performed by the compensator 104 in some cases.

The DPWM 106 receives the duty command value S5 and generates a pulse signal S1 having a duty ratio D corresponding to the duty command value S5. The pulse signal S1 has a predetermined period (hereinafter, referred to as a switching period) Tp, and a section of a high level is referred to as an on-time $T_{ON}$, and a section of a low level is referred to as an off-time $T_{OFF}$:

$$T_{ON}=D\times Tp$$

$$T_{OFF}=(1-D)\times Tp.$$

For example, the DPWM 106 may be configured by a free-run counter and a digital comparator. The free-run counter generates a carrier S4 having a periodically shifted value. The digital comparator shifts the pulse signal S1 at a crossing between the value of the carrier S4 and the duty command value S5. Further, the configuration of the DPWM 106 is not particularly limited and a known technique may be used.

The strobe signal generator 110 generates the strobe signal S6 indicating a sampling timing of the A/D converter 100. The strobe signal generator 110 estimates or determines a time of a substantial center of a slope of the output voltage $V_{OUT}$ based on information S7 received from the DPWM 106, and adjusts a sampling timing $t_{SH}$ using the estimated or determined time as a target position $t_{REF}$ of the sampling timing $t_{SH}$. The information S7 received from the DPWM 106 may be the pulse signal S1, which is an output from the DPWM 106, may be the duty command value S5, which is an input to the DPWM 106, or may be internal data of the DPWM 106. The strobe signal generator 110 may adjust the sampling timing $t_{SH}$ at every switching period Tp or once at several switching periods Tp. In this embodiment, the strobe signal generator 110 adjusts the sampling timing $t_{SH}$ once at every switching period Tp.

The scope of the present disclosure reaches the circuit recognized by the block diagram of FIG. 3, and hereinafter, a specific configuration example of each block will be described.

Figure 4:
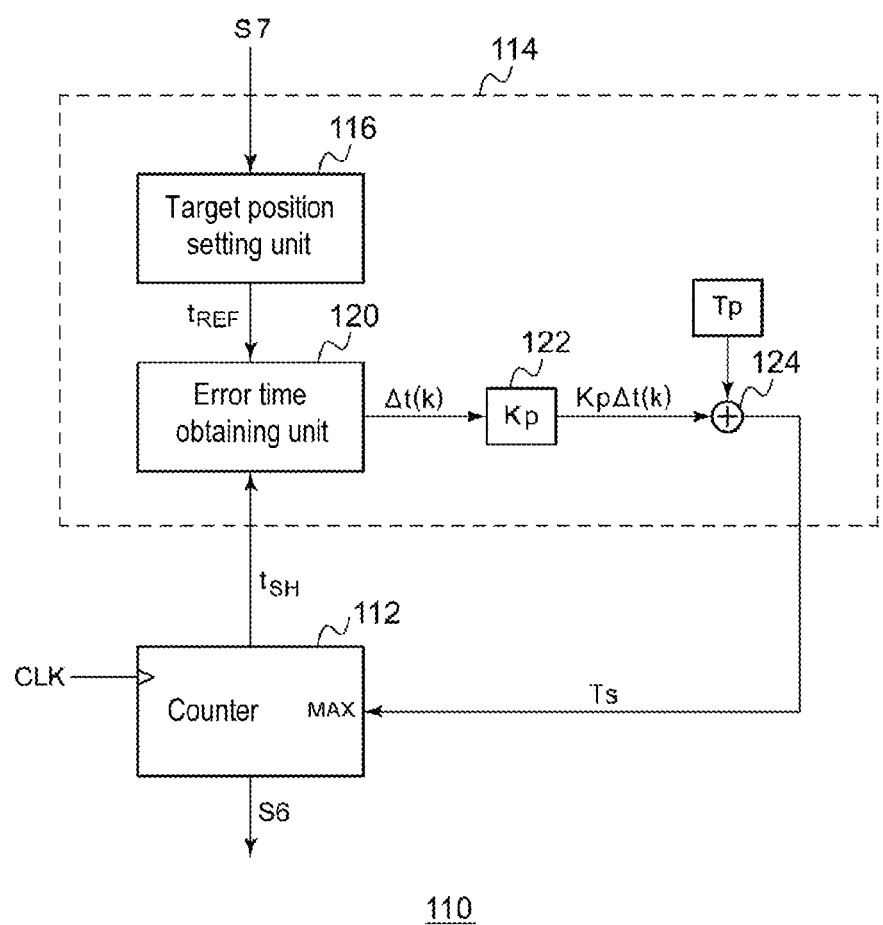
FIG. 4 is a block diagram illustrating a configuration example of a strobe signal generator.

FIG. 4 is a block diagram illustrating a configuration example of the strobe signal generator 110.

The strobe signal generator 110 includes a period counter 112 and a period setting unit 114. The period counter 112 asserts the strobe signal S6 at every period which depends on a variable period set value Ts. The period setting unit 114 sets the target position $t_{REF}$ based on the information S7 from the DPWM 106, obtains an error time Δt between the sampling timing $t_{SH}$ and the target position $t_{REF}$, and sets the period set value Ts based on the error time Δt.

More specifically, the period setting unit 114 may set the period set value Ts(k) at a k-th cycle (where k=1, 2, . . . ) by:

$$Ts(k)=Tp+Kp\times\Delta t(k),$$

where Δt(k) is an error time at the k-th cycle and Kp is a predetermined coefficient.

The period setting unit 114 may be configured as a combination of a target position setting unit 116, an error time obtaining unit 120, a multiplier 122, and an adder 124. The target position setting unit 116 measures or estimates a time at the center of the slope of the output voltage $V_{OUT}$ based on the information S7 from the DPWM 106, and sets the measured or estimated time as the target position $t_{REF}$. The error time obtaining unit 120 obtains the error time Δt(k) at every cycle. The multiplier 122 multiples the error time Δt(k) and the predetermined coefficient Kp. The adder 124 adds the switching period (constant number) Tp and an output from the multiplier 122.

The period counter 112 is configured such that, when the count value S8 of the period counter 112 reaches the period set value Ts(k), the period counter 112 asserts the strobe signal S6 and resets the count value S8 to an initial value to resume a counting operation. When a period of a clock CLK input to the period counter 112 is Tck, an actual period Ts' of the strobe signal S6 on a time axis becomes Ts'=Ts×Tck, establishing a proportional relationship with the period set value Ts. Hereinafter, the actual period Ts' and the set value Ts will not be particularly distinguished.

Various methods may be considered as processes performed by the target position setting unit 116 and the error time obtaining unit 120 of the period setting unit 114. It is recognized that the period setting unit 114 functions: setting the target position $t_{REF}$ of the sampling timing (Function 1), obtaining the actual sampling timing $t_{SH}$ (Function 2), and obtaining the error time Δt between the target position $t_{REF}$ and the actual sampling timing $t_{SH}$ (Function 3).

(First Method)

Regarding Function 1, the target position setting unit 116 of the period setting unit 114 may monitor an edge of the pulse signal S1 and measure a timing at which an edge shift of the pulse signal S1 occurs by using a counter, thereby setting the target position $t_{REF}$.

Regarding Function 2, the period setting unit 114 may monitor the strobe signal S6 and measure a timing at which the strobe signal S6 is actually asserted by using a counter, thereby obtaining the sampling timing $t_{SH}$.

Regarding Function 3, the period setting unit 114 may calculate a difference between the target position $t_{REF}$ and the sampling timing $t_{SH}$ measured by the counters. Alternatively, the period setting unit 114 may obtain the error time Δt by starting a counting operation based on one of the target position $t_{REF}$ and the sampling timing $t_{SH}$ and stopping the counting operation based on the other.

(Second Method)

Regarding Function 1, the target position setting unit 116 of the period setting unit 114 may set the target position $t_{REF}$ based on the duty command value S5. That is, when the switching period Tp is already known, the off-time $T_{OFF}$ may be obtained from (1−D)×Tp and the target position $t_{REF}$ may be obtained by calculating $T_{OFF}/2=(1-D)\times Tp/2$.

Regarding Function 2, the period setting unit 114 may obtain the sampling timing $t_{SH}$ based on the period set value Ts set by the period setting unit 114.

Regarding Function 3, the error time Δt may be obtained by calculating a difference between the set target position $t_{REF}$ and the sampling timing $t_{SH}$.

Further, it will be understood by a person skilled in the art that the processing of the period setting unit 114 is not limited to the above and that the same processing may also be performed by any other method. So far, the configuration of the power supply circuit 2 has been described. Hereinafter, an operation of the power supply circuit 2 will be described.

Figure 5:
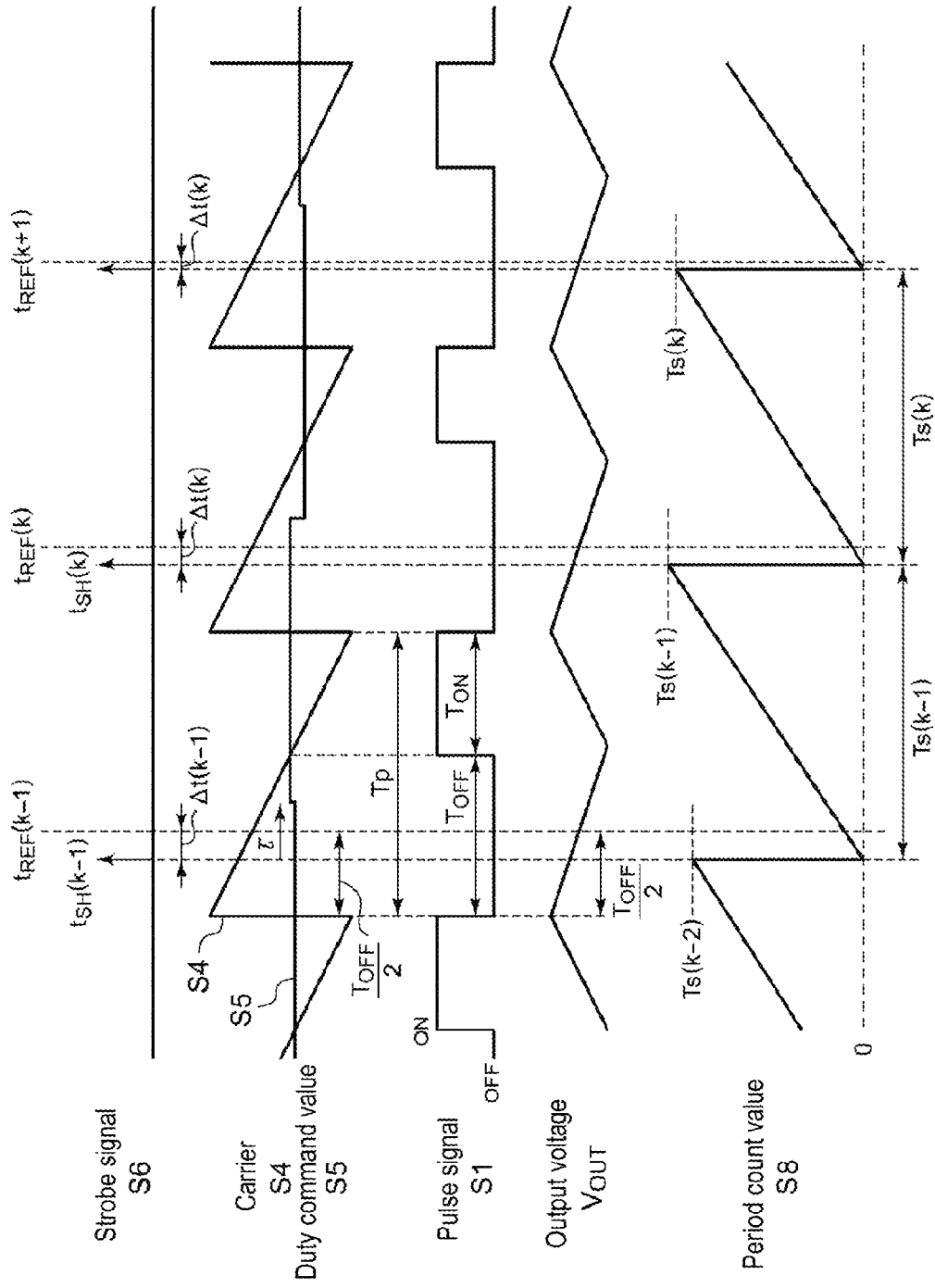
FIG. 5 is an operational waveform diagram of the power supply circuit of FIG. 3.

FIG. 5 is an operational waveform diagram of the power supply circuit 2 of FIG. 3. In FIG. 5, provided in order from above are the strobe signal S6, the carrier S4 generated in the DPWM 106, the duty command value S5, the pulse signal S1, the output voltage $V_{OUT}$, and the period count value S8 of the strobe signal generator 110.

The output voltage $V_{OUT}$ is sampled at the sampling timing $t_{SH}(k)$, and the feedback data S2 is generated. Thereafter, after the lapse of an operation delay t of the error detector 102 and the compensator 104, the value of the duty command value S5 is updated.

The pulse signal S1 has a low level (OFF period $T_{OFF}$) if S4>S5, and has a high level (ON period $T_{ON}$) if S4<S5. Due to an influence of ESR of the output capacitor C1, the output voltage $V_{OUT}$ increases during the ON period $T_{ON}$ in which a coil current flowing in the inductor L1 increases, and decreases during the OFF period $T_{OFF}$ in which the coil current is reduced.

As described above, the target position $t_{REF}$ of the sampling timing is the center of the slope of the output voltage $V_{OUT}$. FIG. 5 illustrates that the target position $t_{REF}$ is set in the center of the downward slope of the output voltage $V_{OUT}$ and also in the center of the off-time $T_{OFF}$ of each cycle.

In the (k−1)-th cycle, the actual sampling $t_{SH}(k-1)$ occurs slightly earlier than the target position $t_{REF}(k-1)$. Therefore, the period Ts(k−1) of the strobe signal S6 in the (k−1)-th cycle is lengthened by Kc×Δt(k) more than the reference period Tp. Thus, the sampling timing $t_{SH}(k)$ in the next k-th cycle is shifted temporally backward to approach the target position $t_{REF}(k)$.

Figure 6:
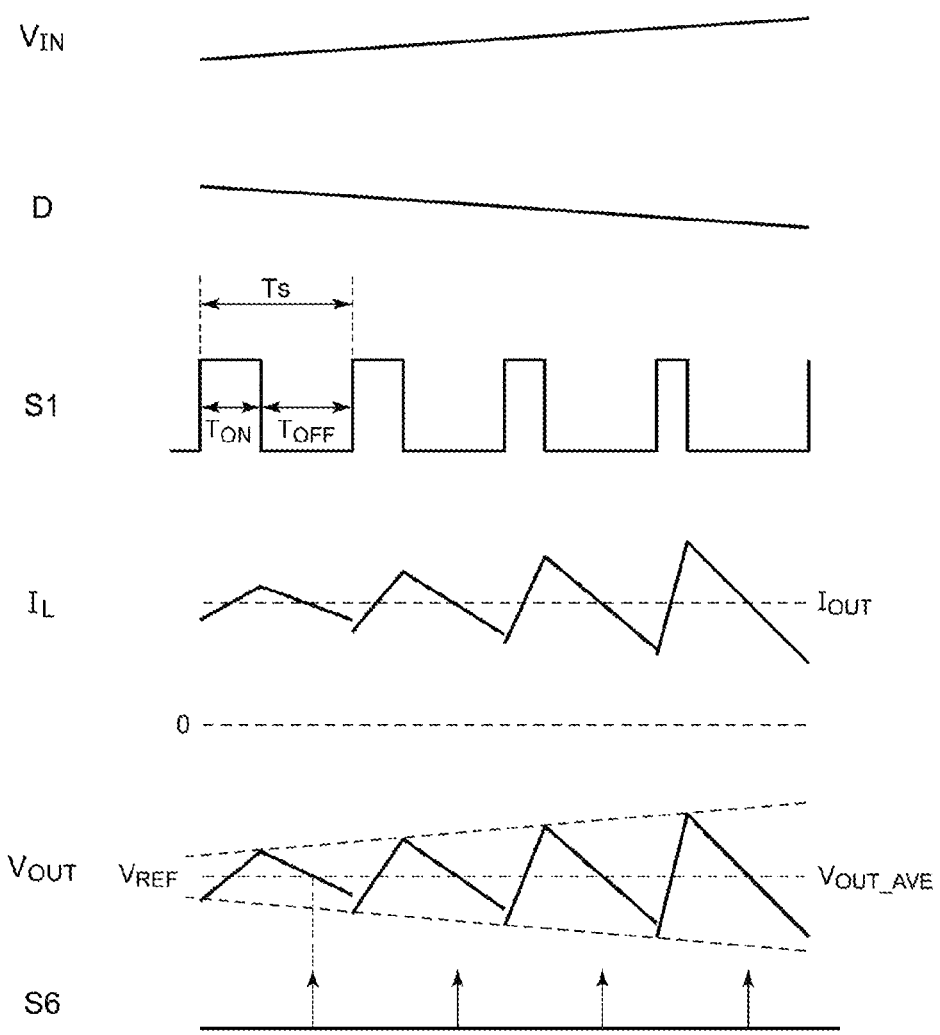
FIG. 6 is another operational waveform diagram of the power supply circuit of FIG. 3.

FIG. 6 is an operational waveform diagram of the power supply circuit 2 of FIG. 3. It is assumed that the input voltage (supply voltage) $V_{IN}$ is changed or the duty ratio D of the pulse signal S1 is changed due to any other factor as illustrated in FIG. 6. When the duty ratio D is changed, the slope length (i.e., the off-time $T_{OFF}$) of the output voltage $V_{OUT}$ is changed, and thus the target position $t_{REF}$ which is the center of the downward slope is also changed. In the power supply circuit 2 according to the embodiment, an average level $V_{OUT\_AVE}$ of the output voltage $V_{OUT}$ can be sampled regardless of fluctuations in the input voltage $V_{IN}$, and thus the average level $V_{OUT\_AVE}$ may be stabilized to a target level. As a result, the PSRR of the power supply circuit 2 can be improved. In FIG. 6, $I_L$ denotes the coil current flowing in the inductor L1.

The present disclosure has been described above based on the embodiment. The present embodiment is merely illustrative and it will be understood by a person skilled in the art that combinations of respective components and processes may be variably modified and such modifications are also within the scope of the present disclosure. Hereinafter, these modifications will be described.

First Modification

Figure 7:
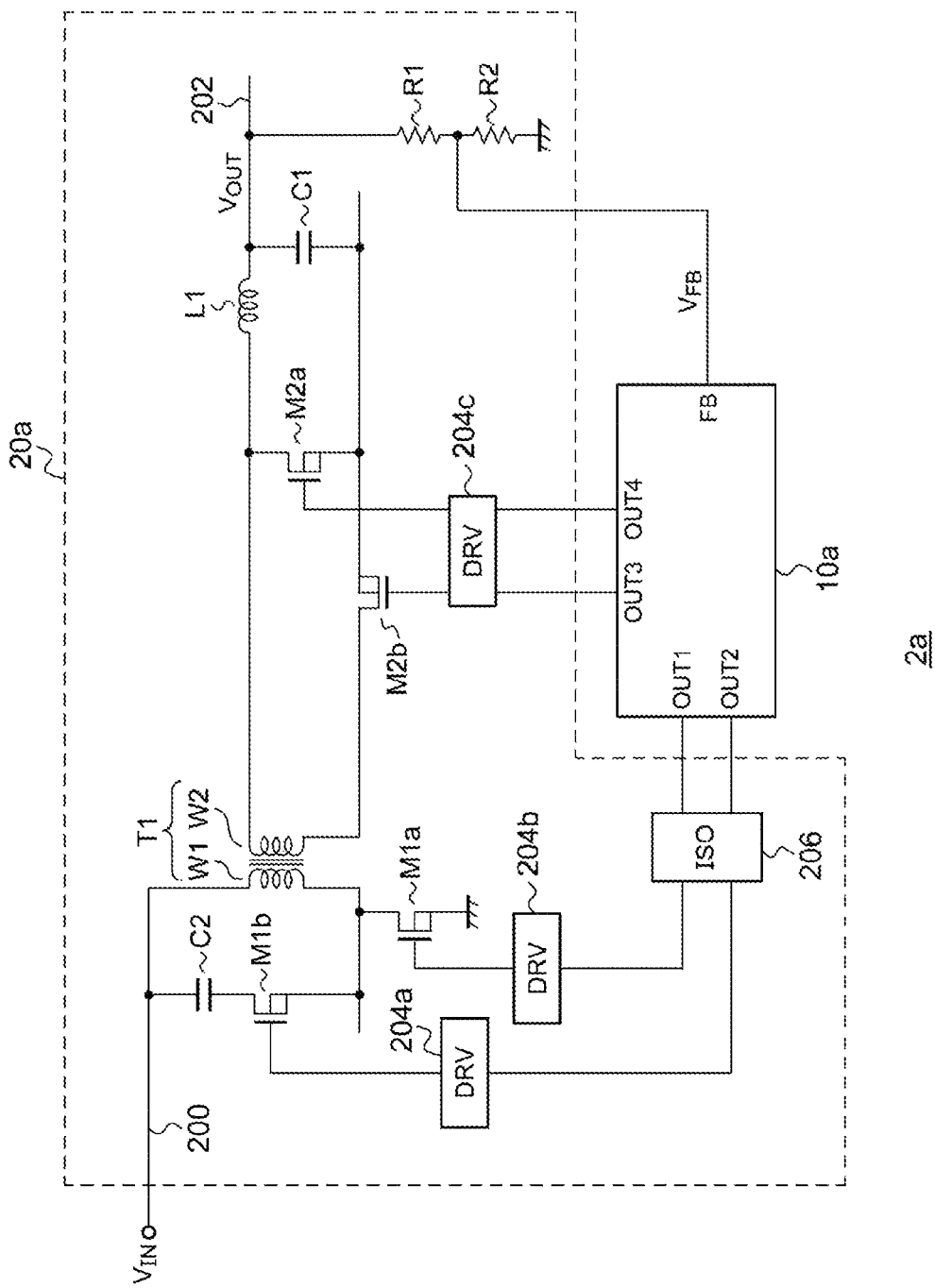
FIG. 7 is a circuit diagram of a power supply circuit according to a first modification.

Although the step-down converter has been described in the embodiment, the present disclosure is not limited thereto. FIG. 7 is a circuit diagram of a power supply circuit 2a according to a first modification. The power supply circuit 2a of FIG. 7 is a so-called active clamp type forward converter. An output circuit 20a is divided into a primary side and a secondary side by a transformer T1. In the primary side, a primary winding W1 of the transformer T1, switching transistors M1a and M1b connected to the primary winding W1, a capacitor C2, and drivers 204a and 204b are installed. For use in a case where the primary side and the secondary side of the transformer T1 need to be insulated from each other, an isolator 206 is added.

In the secondary side, a secondary winding W2 of the transformer T1, rectification transistors M2a and M2b connected to the secondary winding W2, a capacitor C1, an inductor L1, and a driver 204c are installed. Resistors R1 and R2 are configured to voltage-divide an output voltage $V_{OUT}$ to generate a feedback voltage $V_{FB}$.

The control circuit 10a generates a pulse signal S1 based on the feedback voltage $V_{FB}$ input to a feedback terminal FB thereof, and drives the transistors M1a, M1b, M2a, and M2b by using the pulse signal S1 and pulse signals derived therefrom.

The present disclosure is effective in such an active clamp type forward converter. In addition, the present disclosure is also effective in a general forward converter, and may also be effective in a topology in which the rectification transistors M2a and M2b of the secondary side are substituted with diodes.

Second Modification

A control algorithm of the period set value Ts by the period setting unit 114 is not limited to that of the embodiment. While the aforementioned algorithm Ts(k)=Tp+Kp×Δt(k) is recognized as a proportional control (P control), the period setting unit 114 may also perform a PI control or PID.

Third Modification

In the embodiment, although the center of the downward slope of the output voltage $V_{OUT}$ is determined as the target position $t_{REF}$, the present disclosure is not limited thereto and the center of the upward slope (i.e., the on-time $T_{ON}$) may be determined as the target position $t_{REF}$.

(Uses of Power Supply Circuit)

Figure 8A:
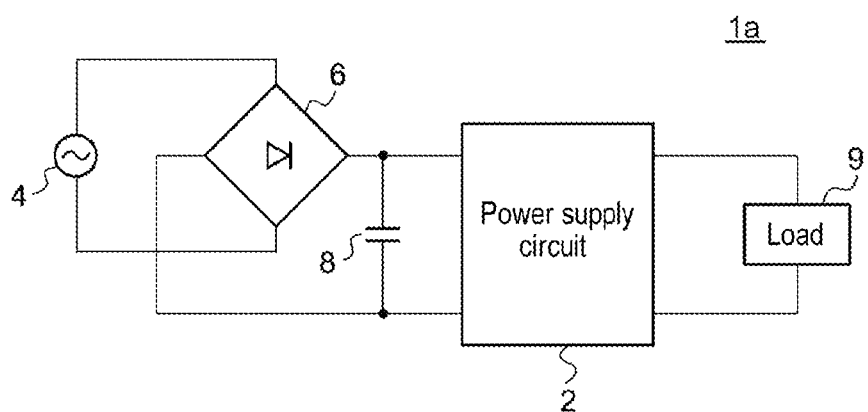
FIGS. 8A and 8B are block diagrams illustrating electronic devices including a power supply circuit.
Figure 8B:
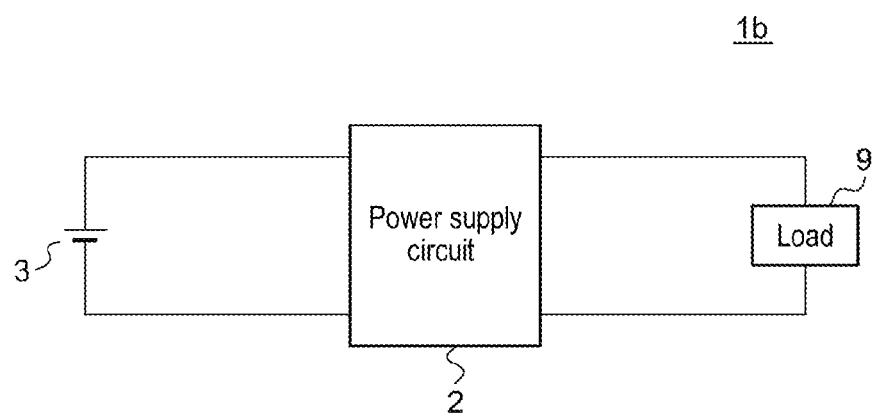

Last, uses of the power supply circuit 2 will be described. FIGS. 8A and 8B are block diagrams illustrating electronic devices having the power supply circuit 2. An electronic device 1a of FIG. 8A includes a bridge circuit 6 that rectifies an AC voltage from a commercial AC power source 4, a smoothing capacitor 8, the power supply circuit 2 described above, and a load 9. In this case, as the power supply circuit 2, a non-insulating step-down, step-up, buck-boost converter or the like may be appropriately used. The electronic device 1a may be, for example, a base station for a mobile communication, home appliances such as a TV, a PC, or a refrigerator, office automation devices such as a facsimile or a copier, machine tools, or the like.

An electronic device 1b of FIG. 8B includes a battery 3, the power supply circuit 2 described above that receives a voltage from the battery 3, and a load 9. The electronic device 1b may be, for example, a portable phone terminal, a tablet PC, a digital camera, a digital video camera, or the like. For example, the load 9 may be a microcomputer and a memory, a liquid crystal driver and an LED for a liquid crystal backlight, or an LED for a camera flash.

According to the present disclosure in some embodiments, it is possible to improve a PSSR of a power supply circuit.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A control circuit of a digital control power supply circuit, comprising:
   an A/D converter that samples a feedback voltage according to an output voltage of the digital control power supply circuit when a strobe signal is asserted and that converts the sampled feedback voltage into digital feedback data;
   an error detector that generates error data which indicates a difference between the feedback data received from the A/D converter and target data indicating a target value of the feedback voltage;
   a compensator that generates a duty command value which is adjusted to approximate the error data received from the error detector to zero;
   a digital pulse width modulator that receives the duty command value from the compensator and that generates a pulse signal having a duty ratio corresponding to the received duty command value; and
   a strobe signal generator that generates the strobe signal, and that adjusts a sampling timing at which the strobe signal is asserted such that the sampling timing approximates a target position set in a substantial center of a slope of the output voltage,
   wherein the strobe signal generator comprises:
   a period counter that asserts the strobe signal at every period which depends on a variable period set value; and
   a period setting unit that sets the target position, that obtains an error time between the sampling timing and the target position, and that sets the period set value based on the error time.

2. The control circuit of claim 1, wherein the period setting unit sets the period set value Ts(k) at a k-th cycle (where k=1, 2, . . . ) by Ts(k)=Tp+Kp×Δt(k), where Tp is a period of the pulse signal, Δt(k) is the error time at the k-th cycle, and Kp is a predetermined coefficient.

3. The control circuit of claim 1, wherein when a count value of the period counter reaches the period set value, the period counter asserts the strobe signal and resets the count value to an initial value to resume a counting operation.

4. The control circuit of claim 1, wherein the period setting unit sets the target position based on the duty command value.

5. The control circuit of claim 1, wherein the period setting unit sets the target position based on an edge of the pulse signal.

6. The control circuit of claim 1, wherein the period setting unit obtains the sampling timing based on the strobe signal.

7. The control circuit of claim 1, wherein the period setting unit obtains the sampling timing based on the period set value set by the period setting unit.

8. The control circuit of claim 1, wherein the digital pulse width modulator generates a carrier having a periodically shifted value, and shifts the pulse signal at a crossing between a value of the carrier and the duty command value.

9. The control circuit of claim 1, wherein the compensator performs a proportional-integral-derivative (PID) control.

10. The control circuit of claim 1, wherein the control circuit is integrally integrated on a single semiconductor substrate.

11. A digital control power supply circuit, comprising:
   an output circuit including at least switching transistors, an inductive element, and an output line that generates a DC output voltage based on a switching operation of the switching transistors; and
   the control circuit of claim 1 that controls the switching transistors based on the output voltage.

12. An electronic device comprising the digital control power supply circuit of claim 11.

13. A base station for a mobile communication comprising the digital control power supply circuit of claim 11.

14. A control method of a digital control power supply circuit, comprising:
   sampling a feedback voltage according to an output voltage of the digital control power supply circuit when a strobe signal is asserted;
   converting the sampled feedback voltage into digital feedback data;
   generating error data which indicates a difference between the feedback data and target data indicating a target value of the feedback voltage;
   generating a duty command value which is adjusted to approximate the error data to zero;
   generating a pulse signal having a duty ratio corresponding to the duty command value;
   driving switching transistors of the digital control power supply circuit according to the pulse signal; and adjusting a sampling timing at which the strobe signal is asserted such that the sampling timing approximates a target position set in a substantial center of a slope of the output voltage,
wherein adjusting a sampling timing comprises:
asserting the strobe signal at every period which depends on a variable period set value; and
setting the period set value based on an error time between the sampling timing and the target position.

* * * * *